United States Patent Office 3,513,546
Patented May 26, 1970

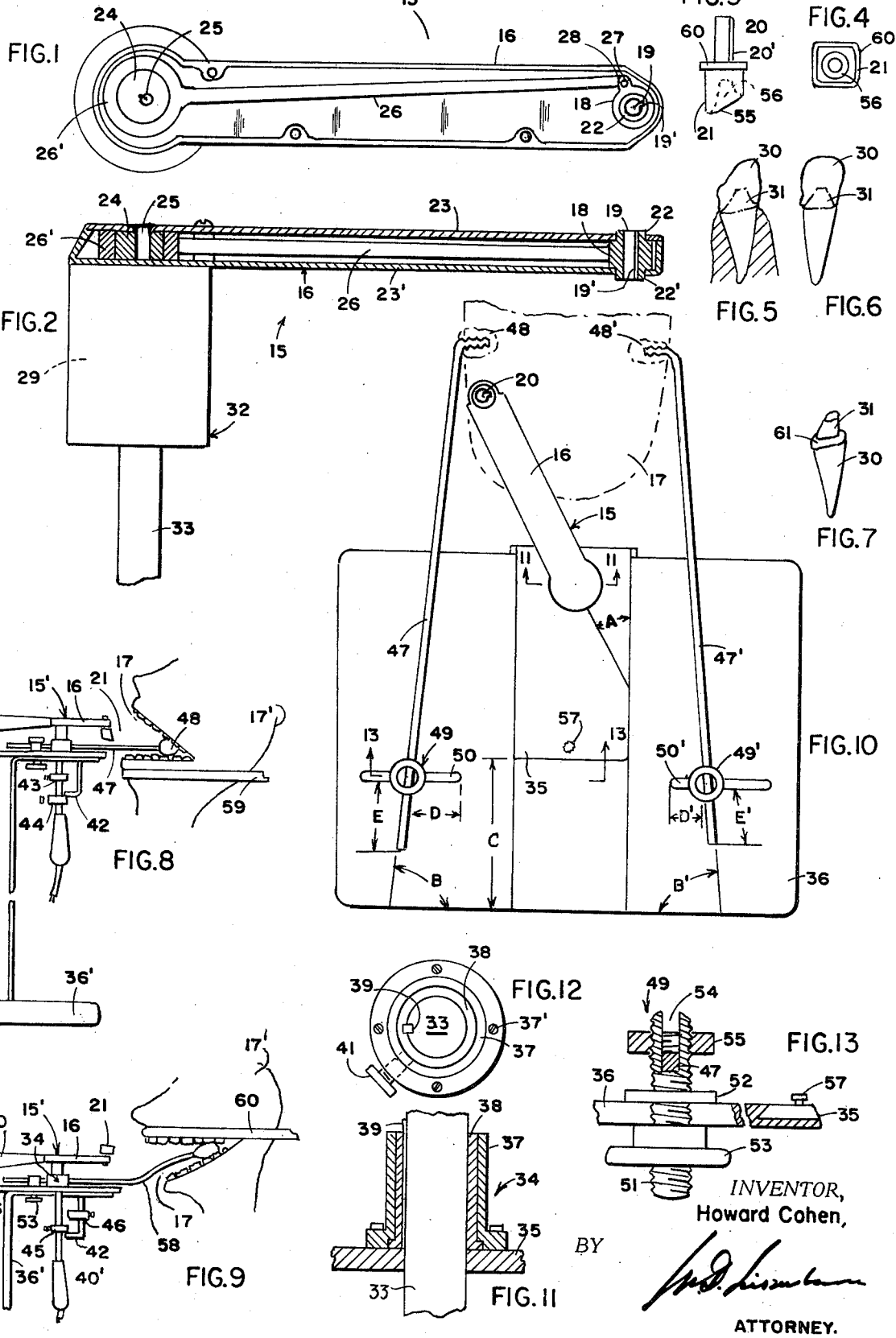

3,513,546
DENTAL APPARATUS
Howard Cohen, 1170 Ocean Parkway,
Brooklyn, N.Y. 11230
Filed Aug. 21, 1967, Ser. No. 662,107
Int. Cl. A61c 3/06
U.S. Cl. 32—59     13 Claims

ABSTRACT OF THE DISCLOSURE

The apparatus is for forming and copying an abutment tooth to serve as an anchor for a crown, bridgework or similar dental attachment. The forming of an abutment is done with a tubular grinding element which is oscillated against the occlusial face of the tooth being treated. Such tooth may be of the mouth or of a model of the mouth. The dentist's use of identical grinding tools, identically positioned and worked as was employed by the laboratory, serves to prepare the mouth as a copy of the prepared model which was initially cut to provide the abutments for the required restoration. This permits the restoration to be installed in the patient's mouth at the same visit as the mouth is prepared, thus avoiding the construction of any temporary replacement thereby saving the dentist's time and reducing costs. The apparatus is also useable for the old method where the mouth is prepared first.

The present invention relates to dental apparatus for preparing abutment teeth for the reception of dental restorations as crowns, bridgework and similar dental attachments.

Heretofore, teeth in the patient's mouth which were to serve as anchors, commonly called abutments, for a proposed restoration, were ground or otherwise machined by the dentist, who then made the necessary impression of the involved prepared mouth region, from which a model was made. On such model, the restoration was fashioned by methods well known in mechanical dentistry. The prepared attachment was taken by the dentist and set into the patient's mouth, into which it fitted with good precision on the abutment teeth. Many patients objected that they often had to walk around with a mouth of grotesque appearance during the time it took for the restoration to be made.

It is therefore an object of this invention to provide apparatus affording the making of a dental restoration before the patient's mouth is prepared with abutments to receive it. It so happens that the apparatus I provide herein, is also usable in the old method of preparing the mouth first and the restoration afterwards, in which instance, the apparatus is not used for any copying function. For the new method, the apparatus is used not only to cut abutments, but to copy in the mouth, the abutment construction presented by the model on which the restoration was built, thus the patient has the restoration installed in the mouth at the same visit as the mouth is prepared.

Another object of this invention is to provide a novel and improved abutment cutting apparatus whose operation is limited to the particular tooth being reated though the grinding element is powered and reduces the tooth structure by action against the occlusial face of the tooth being cut. There is no cutting into adjacent teeth which are not to be touched.

Another object thereof is to provide said apparatus with means which aids the dentist to reproduce in the mouth, abutment structure which is identical to that which the laboratory formed on the model, preparatory to making the restoration thereon.

Still a further object of this invention is to provide novel and improved apparatus of the character described, which are easily used and followed by dentists and dental mechanics, and the apparatus shall be of simple construction, reasonable in cost to manufacture and efficient in carrying out the purposes and functions for which it is designed.

Other objects and advantages will become apparent as this disclosure proceeds.

In the accompanying drawing forming a part of this specification, similar characters of reference indicate corresponding parts in all the views.

FIG. 1 is a top plan view of a grinding device for reducing tooth structure to form an abutment for a dental restoration, embodying teachings of this invention. The top cover of the casing is omitted to show mechanism to oscillate the grinding element.

FIG. 2 is an elevational view of the device of FIG. 1, shown partly in section. Here, the grinding element is omitted in order to show the chuck means into which it is received to extend in the direction of the jaw of the teeth it is to work on.

FIG. 3 is an elevational view of a grinding element for use in the device.

FIG. 4 is a bottom view of FIG. 3.

FIG. 5 is an interproximal view of a tooth whose structure will be reduced by said grinding element, to form an abutment shown in dash and dot line.

FIG. 6 is a buccal view of the tooth of FIG. 5, and the abutment formed thereof is shown in dash and dot line.

FIG. 7 is a perspective view of the abutment mode.

FIG. 8 shows the side view of a dental apparatus including the device of FIG. 1 and means to aid the dentist to copy in the patient's mouth, an abutment which is the exact duplicate of that on a model of the mouth; said model having been used to fashion the restoration. The work to be done here is on a tooth of the lower jaw of the patient, whose head is shown.

FIG. 9 is a view like FIG. 8, but here the work to be done is on a tooth of the upper jaw of the patient. FIGS. 8 and 9 are drawn to reduced scale.

FIG. 10 is an enlarged top plan view of the apparatus arranged as shown in FIG. 8.

FIG. 11 is an enlarged fragmentary section taken at line 11—11 in FIG. 10.

FIG. 12 is a top plan view of FIG. 11.

FIG. 13 is an enlarged section taken at line 13—13 in FIG. 10. This view is fragmentary.

In the drawing, the numeral 15 designates generally a tooth grinding device which includes a horizontally extending casing 16 for admission into the mouth 17, as a finger at whose tip end is a chuck means which in the embodiment illustrated, is a double-hubbed wheel 18 having a central hole 19 to hold the shank 20 of a grinding element 21. The hubs 22, 22' are journalled in aligned openings in the cover plate 23 and the bottom wall 23' of said casing 16, so the wheel 18 is rotatable about a vertical axis. The shank 20 is slidable, but is in frictional engagement in the said hole 19, and hence can be mounted so that the grinding element 21 extends upwardly as in FIG. 9 when an upper tooth is to be worked on, or downwardly as in FIG. 8, when a lower tooth 30 is to be worked on to be reduced as shown at 31 to serve as an abutment. The shank 20 of the grinder element 21, must move with said chuck 18, and therefore it may be releasably associated therewith by having the key 20' therealong, and said hole has a longitudinal keyway 19' to receive said key. The wheel 18 need be given an oscillatory rotary movement, preferably of about one millimeter range. One manner of doing this is to have an eccentric wheel 24 fixed on a power-driven shaft 25, with a follower connecting rod 26 having at one of its ends the ring 26', riding on the periphery of the wheel 24, while its other end is pivotally linked at 27 to a crank 26 of clevis-form which extends from the periphery of the wheel 18. Upon the rotation of the shaft 25, which may be the shaft of an electric motor indicated by the numeral 29, as housed in the handle or post 32 of the device 15, the wheel 18, and hence the abrasive element 21 will be oscillated.

The terminal piece 33 of the post 32, may be fitted with, or serve as a handle so the device 15 can be used as a hand tool for a purpose as will be explained further herein. In the embodiment shown in FIGS. 8–13, the post is made of suitable length, and is slidably and rotatably mounted through a vertical bearing structure indicated generally by the numeral 34, carried on a slide 35 which is on the table top 36 of a weighed stand 36', positioned in front of the seated patient 17'. Said bearing structure comprises a flanged outer tubular member 37 secured by bolts 37' to the slide 35. The post extension 33 is through the slide and said table top, and through a sleeve 38 to which it is keyed by 39, but free for longitudinal movement, and in frictional engagement with said sleeve, and adapted to be vertically moved as need be, by either of the handles 40, 40'. Said sleeve 38 has a flange 38' captured in a counterbore in the flange of the outer tubular member 37. It is evident that the device 15' is always vertically slidable, but is rotatable only when the set screw 41 does not engage the sleeve 38. The numeral 42 designates a fixed stop, while the adjustable stops are indicated by the numerals 43, 44, 45 and 46, which are set as need be, depending on whether lower or upper teeth are to be treated. The numerals 47, 47' denote square gage bars to be entered into the mouth, one at each cheek, where the distal ends of said bars carries a mass of impression material respectively shown as 48 and 48'. These bars 47, 47' are positioned horizontal with the slide 35 between them, on the respective mounts denoted generally by the numerals 49, 49', each of which is adjustable along a track slot, shown at 50, 50' respectively; said mounts being turnable and securable to the table top 36, and said gage bars being slidble in their respective mounts and securable in position. Each mount comprises a screw as 51, having an intermediate flange 52 which rests on the table 36. The bottom part of the screw is through a track slot aforementioned, and carries a releasable tightening nut 53. The gage bar 47 rests horizontally on the flat bottom of a downward slot 54, in the upper part of the screw 51, which is above the table top, and is releasably held by a tightening nut 55.

It is evident that any setting of the components of the equipment included in FIG. 10, and their relative positions, are precisely defined, if the following measurements are noted, namely:

Angle A which is the slope of the elongated finger 16 of the grinding tool 15';

Angle B which is the slope of the gage bar 47;

Angle B' which is the slope of the gage bar 47';

Distance C which shows the position of the slide 35 when the grinding element 21 is in proper position in relation the tooth to be worked on;

Distance D from the inner end of the track slot 50 to the flange 52, and distance E from the end of the gage bar 47 to the nut 54, to determine the position of the mount 49; the diameters of the parts 52 and 54 being equal for convenience.

Distance D' from the inner end of the track slot 50' to the flange 52', and the distance E' from the end of the gage bar 47' to the nut 54', to determine the position of the mount 49'; the diameters of the parts 52' and 54' being equal for convenience.

It is believed that those versed in the mechanical arts will readily comprehend without the necessity of further illustration, that to facilitate the above measurements, the angles may be determined by protractor means, and the distances, by graduations along the track slots 50, 50' to read D and D', by graduations on the upper surfaces of the gage bars 47, 47' to read E and E', and by graduations along the track edge of the slide support, to read C.

The most important method made capable by this apparatus, is to merely make an impression of the patient's mouth on the first visit to the dentist. From the impression, which the dentist sends to the laboratory, a model of the mouth is made, and abutments are made on the model by the laboratory, which then proceeds to make the dental restoration, as a bridge or the like, for the prepared model. The restoration is then returned to the dentist. At the second, which is the final visit of the patient to the dentist, the dentist prepares the patient's mouth to be an exact copy of the prepared model, and so the restoration is then and there installed.

As will be set forth, various measurements need be made by the dentist and the laboratory, and exchanged between them, for the operation. Also, dentist and laboratory must have identical apparatus taught herein, as shown in FIGS. 8–10, as well as an assortment of grinding tools which are identifiable by number or other notation to define size and shape.

If the work to be done is on the lower teeth, then at the first visit to the dentist, the patient sits behind the stand 36', and with suitable clamping means indicated fragmentarily at 59, the patient's head 17' is immobilized so that the occlusial plane of the lower teeth is horizontal and the height of seat or stand is so adjusted that the horizontal gage bars 47 and 47', carrying impression material 48, 48', can be entered into the mouth, and a bite impression taken on each of said masses 48, 48', after said gage bars are properly positioned and secured in the mounts 49, 49'. The dentist must note the angular dimensions B, B', and the linear dimensions D, D' and E, E', and he should name the teeth involved in the bite impressions on 48 and 48'. Upon removal of the gage bars, or before their insertion, an impression is made of the mouth's lower teeth. If the work to be done is on the upper teeth, then a set of bent gage bars as 58 need be used, when the head 17' of the patient is immobilized by clamp means shown fragmentarily at 60, to hold the occlusial plane of the upper teeth in horizontal position. The dentist then sends to the laboratory the gage bars with the end masses thereon having the bite impressions, the mouth impression, and a copy of the measurement data he made note of. The laboratory now makes a cast of the mouth impression, which it sets up as the model of the mouth in conjunction with an apparatus of FIG. 10, and fits the gage bars to fit such model, and sets its apparatus, making the required adjustments and settings to have the measurements the dentist transmitted. Now the laboratory uses the cutting mechanism 15 with proper grinding elements on the teeth of the model that need to be worked on, an example of which is the tooth 30 which needs be ground to be the abutment 31. Of course, the laboratory notes the angle A and the distance B at each tooth position worked on, as well as the tool shapes used with the respect to each worked-on tooth, the limits of the respective depths of the grinding done on each other as determined by the necessary settings made for the stops 42, 43, and 42, 46, as the case may be. Since the up and down movement of the grinding tool is always along the vertical, parallelism of the abutments made is attained automatically. The laboratory now builds the restoration on the prepared model, and send it to the dentist with the apparatus positioning data, and the tool forms used, and returns therewith the gage bars holding their bite impressions. Upon the patient's second visit to the dentist, the latter sets up his apparatus and positions the patient in relation thereto so he can now work on the teeth in the mouth, to make the mouth a copy of the prepared model. The restoration fits the mouth made as a copy of the prepared model, and so after final securing steps, the dentist's work is finished at said second visit.

The grinding element 21 is preferably of abrasive stone or the like, and essentially is a wheel-form secured on a central shank to turn therewith. The shank has a flange 60 against the grinding wheel, to serve as a stop against the hub of the chuck structure 18. These grinding tools of FIG. 3 are to be on hand, of a set of shapes and sizes to suit different teeth. The face of the grinding wheel contacts the occlusial face of the tooth to be worked on to form an abutment. Each grinding wheel has a socket 56 of frusto-conical shape or it may be tubular and present the equivalent interior, so that resulting abutment 31 will be a frusto-conical shape. The periphery of the grinding wheel 21 may be circular, or prismatic, and though the designation "wheel" is used, its shape may be other than round, to suit the particular tooth it is to work on. The oscillatory movement of the grinding wheel, limits its cutting to the tooth it is on, and does not impinge on adjacent teeth. All the grinding wheels of a set are identifiable by some special notations respectively, to facilitate an interchange of data between the laboratory and the dentist, each of whom has a set as part of their equipment for use in conjunction with the apparatus of FIG. 10. The contacting cutting surface 55 of the wheel 21, may be sloped to conform to the tooth surface 61 which is required at the base of the abutment 31, to take care of the different heights of the gum at the buccal and the lingual sides of the tooth being reduced. The shank of each grinding tool will of course have a key 20' therealong, at a position which will correctly place the tool in the device 15, to be in proper relation in the chuck device 18, and it is evident that in each cutting tool, its shank and socket are coaxial.

It is to be noted that for the practice of the old method referred to herein, where first the mouth was prepared with abutment structure, and then the restoration was made on a model cast of the prepared mouth, the grinding device 15 per se, may be used as a hand tool to grind a single abutment 30 in the mouth, as would be suitable for a crown, and when such device 15 is used in its mount 34 on the slide 35, plural abutments can be made in true parallel relation, directly in the mouth, for the practice of said old method. Since no copying steps of cutting operations are required, there is no need or use in the old method, for the gage bars or the taking or noting any measurements.

I claim:

1. In a dental device of the character described, in combination, a horizontally extending, elongated casing, one end of which is adapted to be entered into a patient's mouth, a chuck means mounted at said end of said casing, for oscillatory rotary movement about a vertical axis, a tool shank extending vertically outwardly from said chuck and engaged thereto to turn therewith, a grinding element secured on the outward end of said shank in extension thereof, and presenting a surface at the free outward end thereof, which surface is to be pressed against the occlusial face of a tooth, said surface of said grinding element being of a predetermined area in relation to the occlusial face of the tooth to be worked on, and of a predetermined contour in relation to the gum formation at said tooth, an actuatable member extending in said casing at the other end thereof, and means in said casing associated with both said member and said chuck means, adapted to impart oscillatory movement to the chuck about said axis upon actuation of said member; said grinding element having a socket coaxial with said shank and opening in the surface which is for contact with said tooth face, whereupon operation of said device to grind a tooth from its occlusial face a predetermined depth, tooth structure entering said socket will be left intact to form an abutment for receiving a dental restoration, and adjacent teeth and said gum structure will be untouched by said grinding element.

2. A dental device as defined in claim 1, wherein the shank is releasably held in said chuck means, and the said chuck has a passage for receiving said shank, open at the top and at the bottom of said casing, whereby the shank is enterable into the chuck through the top end of said passage whereupon the grinding element is above the casing and hence adapted to work on an upper tooth of a patient, and the said shank is also enterable into the chuck through the bottom end of said passage, whereupon the grinding element is below the casing and hence then adapted to work on a lower tooth.

3. A dental device as defined in claim 1, wherein said socket is frusto-conical.

4. A dental device as defined in claim 1, wherein the said actuatable member is a motor-driven shaft.

5. A dental device as defined in claim 4, wherein said elongated casing extends from a handle, and including a motor arranged to drive said shaft, housed in said handle.

6. A dental device as defined in claim 1, including a vertical post; said elongated casing extending from said post, a table to be positioned in front of a patient, a bearing carried by the table; said post being fitted in said bearing for vertical movement and for axial rotary movement therein, and a handle means for manual movement of said post in said bearing structure.

7. A dental device as defined in claim 6, including stop means carried on the table, to limit the extent of vertical movement of said post.

8. A dental device as defined in claim 6, including a slide movably mounted on the table and means to secure the said slide releasably to said table; said bearing which holds said post, being carried on said slide which is on the table.

9. A dental device as defined in claim 8, including elongated gage bars, an individual mount for each of said gage bars; said mounts being one to the right and one to the left of said slide; each mount being rotatably carried on the table; said gage bars being longitudinally slidable on said mounts and held thereon against lateral movement, means for releasably securing the position of said mounts respectively and means for securing the gage bars releasably on said mounts respectively; said gage bars being adapted to be entered into the mouth of a patient; each gage bar, at that end thereof which is to be in the mouth, being adapted to carry a mass of impression material for a bite impression.

10. A dental device as defined in claim 9, wherein the table is provided with a track from left to right, one for each of said gage rod mounts to move along when free to move on the table.

11. A dental device as defined in claim 9, wherein the shank is releasably held in said chuck means, and the said chuck has a passage for receiving said shank, open at the top and at the bottom of said casing, whereby the shank is enterable into the chuck through the bottom end of said passage whereupon the grinding element is below the casing and hence adapted to work on a lower tooth, and the said shank is also enterable into the chuck through the top end of said passage, whereupon the grinding element is above the casing and hence then adapted to work on an upper tooth.

12. A dental device as defined in claim 11, including stop means carried on the table, to limit the extent of vertical movement of said post.

13. In a dental device of the character described, in combination, a horizontally extending elongated casing, one end of which is adapted to be entered into a patient's mouth, a chuck means mounted at said end of said casing, for a predetermined form of oscillatory movement about a vertical axis, a tool shank extending vertically outwardly from said chuck and engaged thereto to turn therewith, a grinding element secured on the outward end of said shank in extension thereof, which is to be pressed against a tooth, an actuatable member extending in said casing at the other end thereof, means in said casing associated with said member and also with said chuck means, adapted to impart said oscillatory movement to the chuck about said axis upon actuation of said member, a vertical post depending from said casing, a support means having said post mounted thereon; said support means consisting of a table, a bearing carried by the table; said post being fitted in said bearing for vertical movement and for axial rotary movement therein, a handle on the post, for manual movement of said post in said bearing, a slide movably mounted on said table, means to releasably secure said slide to said table; said bearing which holds said post, being carried by said slide which is on the table, at least one elongated gage bar for positioning a patient's head so as to avoid movement of the head, an individual mount for each gage bar; each mount being rotatably carried on the table; each gage bar being longitudinally slidable in its mount, and held thereon against lateral movement, means for releasably securing the position of each of said mounts leasably on its mount respectively; each gage bar being adapted to be entered into the mouth of a patient; at most, there being two gage bars, one to the right and one to the left of said slide, when two gage bars are included; each gage bar, at that end thereof which is to be in the mouth, being adapted to carry a mass of impression material for a bite impression, so as to position the patient.

References Cited

UNITED STATES PATENTS

| | | | |
|---|---|---|---|
| 1,614,144 | 1/1927 | Montag | 32—58 XR |
| 3,037,283 | 6/1962 | Sharp | 32—67 |

ROBERT PESHOCK, Primary Examiner